United States Patent [19]

Tran et al.

[11] Patent Number: 5,517,504
[45] Date of Patent: May 14, 1996

[54] METHOD AND SYSTEM FOR PROVIDING UPLINK/DOWNLINK COLLISION AVOIDANCE IN A WIRELESS COMMUNICATION SYSTEM

[75] Inventors: Phieu M. Tran, Lincolnwood; Jeffrey C. Smolinske, Hoffman Estates; Robert C. Scheibel, Jr., Schaumburg; Christopher L. Clanton, Chicago, all of Ill.

[73] Assignee: Motorola, Inc., Schaumburg, Ill.

[21] Appl. No.: 282,833

[22] Filed: Jul. 29, 1994

[51] Int. Cl.[6] ........................................... H04J 3/16
[52] U.S. Cl. ............................................. 370/95.3
[58] Field of Search ........................... 370/85.2, 85.3, 370/95.1, 95.3, 94.1, 31, 32

[56] References Cited

U.S. PATENT DOCUMENTS

| | | | |
|---|---|---|---|
| 4,949,335 | 8/1990 | Moore | 370/31 |
| 5,040,175 | 8/1991 | Tuch et al. | 370/85.2 |
| 5,091,906 | 2/1992 | Reed et al. | 370/31 |
| 5,119,375 | 6/1992 | Paneth et al. | 370/95.1 |
| 5,142,533 | 8/1992 | Crisler et al. | 370/85.2 |
| 5,319,635 | 6/1994 | Reed et al. | 370/31 |
| 5,371,734 | 12/1994 | Fischer | 370/95.3 |
| 5,379,290 | 1/1995 | Kleijne | 370/85.3 |
| 5,386,435 | 1/1995 | Cooper et al. | 370/31 |

OTHER PUBLICATIONS

D. J. Goodman, R. A. Valenzuela, K. T. Gayliard, & B. Ramamurthi, "Packet Reservation Multiple Access for Local Wireless Communications", IEEE Transactions on Communications, vol. 37, No. 8, Aug. 1989, pp. 885–890.

Primary Examiner—Douglas W. Olms
Assistant Examiner—Min Jung
Attorney, Agent, or Firm—Darleen J. Stockley

[57] ABSTRACT

Collision avoidance is maximized by placing collision avoidance scheduling in a central access manager. The central access manager coordinates downlink transmissions of a base site with the uplink transmissions by subscriber units, virtually avoiding collisions of the two types of transmissions. The subscriber units utilize a waiting period prior to transmission of packets to permit the central access manager to maintain the scheduling.

17 Claims, 7 Drawing Sheets

```
┌─────────────────────────────────────────────────────────┐
│ DETERMINING, BY THE CENTRAL ACCESS MANAGER DURING A     │
│ PREDETERMINED TIME INTERVAL, WHETHER A SELECTED SUBSCRIBER │
│ UNIT IS TRANSMITTING, AND WHERE THE SELECTED SUBSCRIBER │
│ UNIT IS IDLE, TRANSMITTING A PACKET ON A CONTENTION TIME │
│ SLOT/FRAME TO THE SELECTED SUBSCRIBER UNIT              │
└─────────────────────────────────────────────────────────┘ 502
                             │
                             ▼
┌─────────────────────────────────────────────────────────┐
│ WAITING, BY EACH OF A PLURALITY OF SUBSCRIBER UNITS, FOR │
│ A PREDETERMINED LENGTH OF TIME BETWEEN TRANSMISSION OF  │
│ CONSECUTIVE PACKETS ON AN UPLINK CHANNEL TO ALLOW       │
│ TRANSMISSION OF A PACKET FROM THE CENTRAL ACCESS MANAGER │
│ ON A DOWNLINK CHANNEL AND CHECKING AN ANNOUNCEMENT TIME │
│ SLOT/FRAME FOR AVAILABILITY OF THE CONTENTION TIME      │
│ SLOT/FRAME ON THE UPLINK CHANNEL PRIOR TO TRANSMISSION  │
│ OF A PACKET ON THE CONTENTION TIME SLOT/FRAME           │
└─────────────────────────────────────────────────────────┘ 504
```

*500*

100

200

300

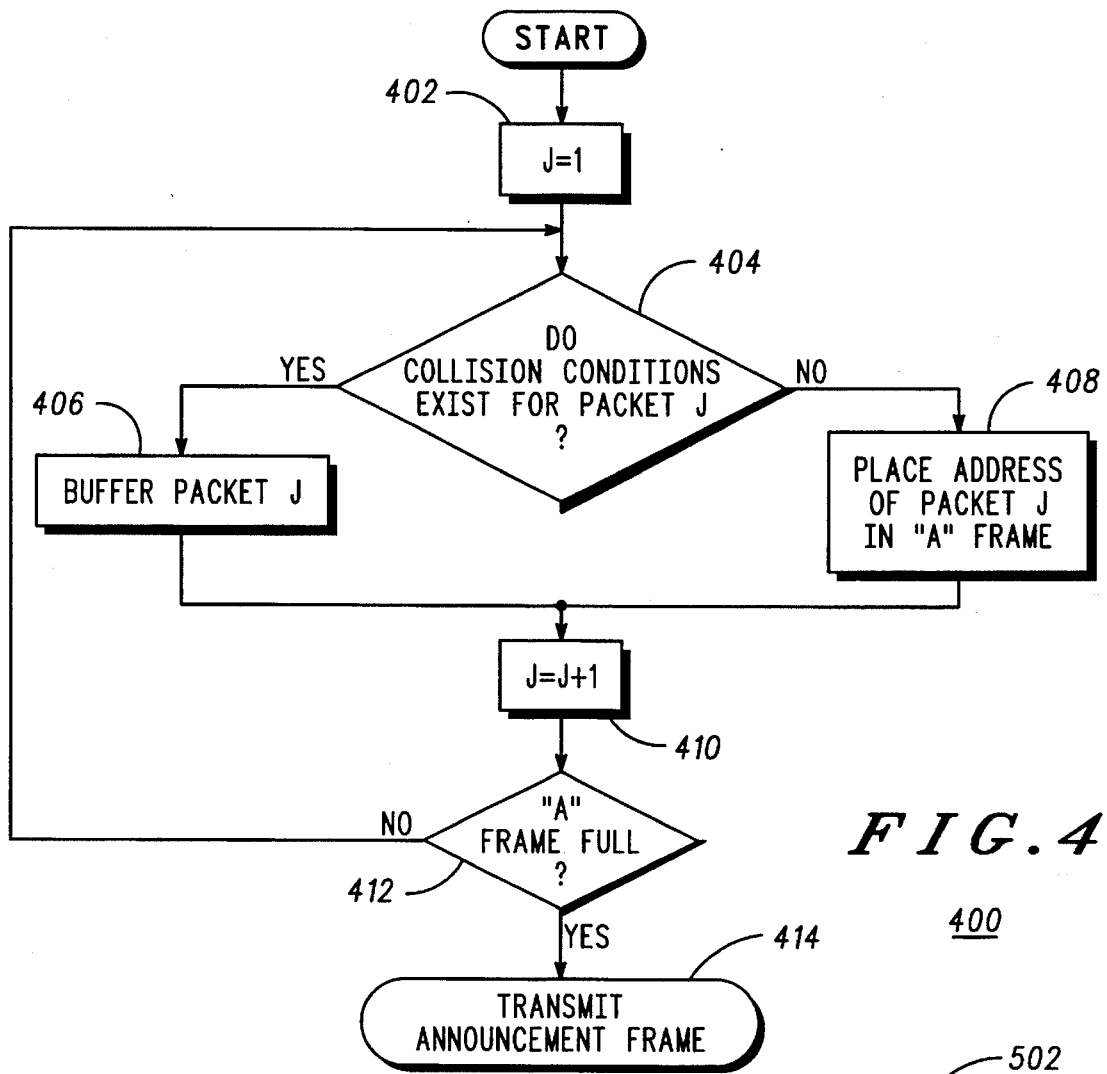

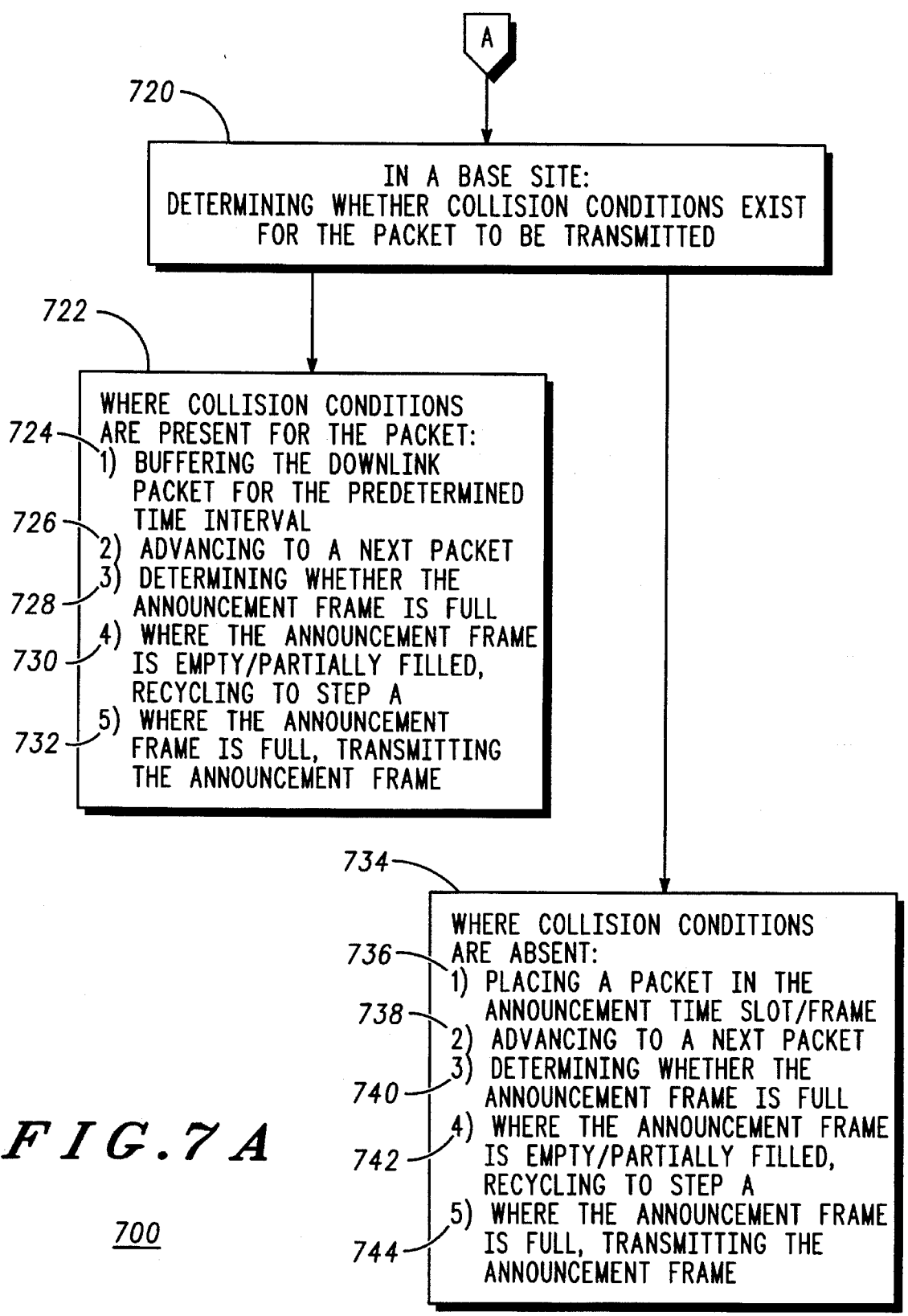

800

900

METHOD AND SYSTEM FOR PROVIDING UPLINK/DOWNLINK COLLISION AVOIDANCE IN A WIRELESS COMMUNICATION SYSTEM

FIELD OF THE INVENTION

The present invention relates generally to access control in a communication system, and more particularly to optimization of access control for collision avoidance in a communication system.

BACKGROUND

In time-division multiple access (TDMA) communication systems, each frame is an interval of T seconds, and each frame is divided into n discrete time slots. Thus, subscriber units can communicate with each other on a basis of non-overlapping transmission bursts. Since there is no overlap, a same pair of carrier frequencies, one for uplink and one for downlink, may be assigned to all subscriber units using a same base site.

The TDMA technique is characterized by duration of the time frame and the time slot within the frame. Each time slot typically consists of a guard time, a preamble, and the information to be transmitted. Typically, the preamble contains system information such as synchronization, control and routing information. The guard time and the preamble generally depend on the organization of the system. The information to be transmitted occupies a predetermined number of bits.

Some time division multiple access, i.e., TDMA, systems, allow contention for the use of one slot to occur across multiple slots. In this type of system, subscriber unit terminals may effectively be designed to be half-duplex. For example, subscriber units may attempt to increase efficiency for a wireless system that is primarily intended for circuit-switched traffic by using excess system capacity for packet-switched data services via similar subscriber unit equipment. While the equipment may be full-duplex, said equipment may be incapable of transmitting and receiving data on two different time slots since this is not required for full-duplex circuit mode communication in a TDMA system. In this system, the incidence where a particular subscriber unit is transmitting a packet of data on a first time slot, and a base station is transmitting a packet to the same subscriber unit on a second time slot, is called a collision. When collision occurs, at least one of the two transmitted packets will be lost. Thus, retransmission of the lost packet is required, and system throughput is reduced.

Depending upon the type of packet services being used, the number of time slots, and the number of subscriber units, the collisions tend to significantly degrade system performance. Use of a reservation contention algorithm may add a significant amount of delay to the system. Thus, there is a need for a collision avoidance method and system that prevents collision of transmitted packets, thus alleviating the necessity for retransmission of lost packets and increasing system throughput.

BRIEF DESCRIPTIONS OF THE DRAWINGS

FIG. 4 is a flow chart of steps taken by the central access manager in accordance with the present invention.

FIG. 5 is a flow chart of one embodiment of a method for providing uplink/downlink collision avoidance of packets of transmitted data in a time division multiplex communication system in accordance with the present invention.

DETAILED DESCRIPTION OF A PREFERRED EMBODIMENT

The present invention allows a communication system to reduce average packet delay and increase system throughput by distributing collision avoidance between a central access manager and a plurality of subscriber units. The central access manager coordinates downlink transmissions of a base site with the uplink transmissions by subscriber units while the subscriber units coordinate the uplink transmission with the downlink transmission, virtually avoiding collisions of the two types of transmissions.

Figure 1:
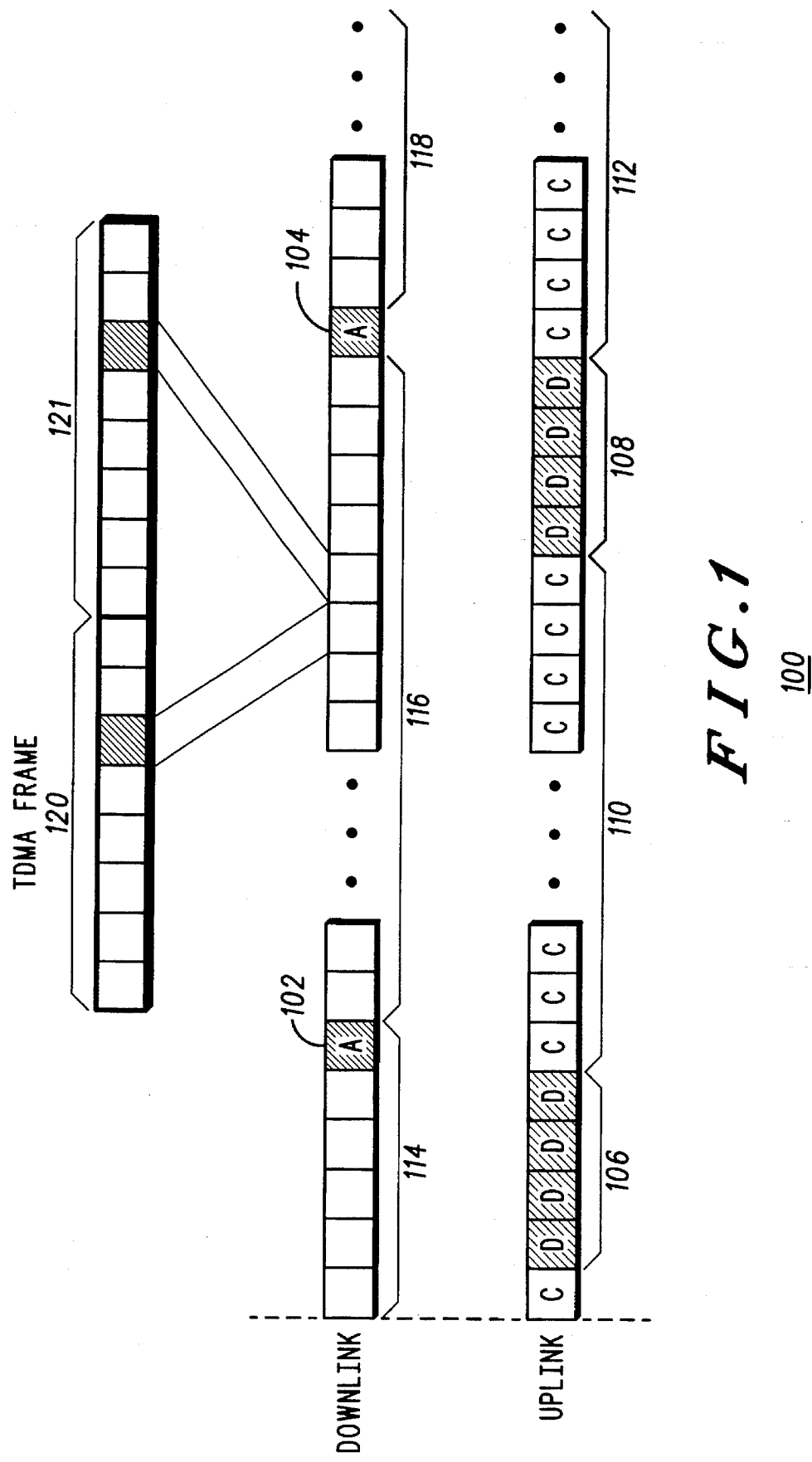
FIG. 1 is a schematic showing an exemplary distribution of collision-resolving time slots/frames in a TDMA system in accordance with the present invention.

FIG. 1, numeral 100, is a schematic showing an exemplary distribution of collision-resolving time slots/frames in a TDMA system in accordance with the present invention. A central access manager in a base site, places, in an announcement frame A (102, 104, . . . ), an address of a packet to be transmitted on the downlink at predetermined time intervals. In order to allow the central access manager to obtain the necessary information on the status of the uplink channel prior to placing the address of the packet in the frame, a predetermined number N, N an integer, of collision-resolving time slots/frames located immediately prior to the announcement frame A (102, 104, . . . ) are designated as non-contention frames, D (106, 108, . . . ), that are only available for packet transmission on the uplink and have no restriction on the downlink. Collision-resolving time slots/frames that are available for contention (110, 112, . . . ), C, are located in the position bounded by the non-contention frames D (106, 108, ...) and the announcement frame A (102, 104, ...). In the uplink, both types of frames, C and D, are available for packet transmission. Thus, upon completion of transmission of an uplink packet, a subscriber unit waits in accordance with the time encompassed by the predetermined number of non contention frames to read a next announcement frame, refraining from contending for an uplink time slot/frame until the subscriber unit has determined that none of the downlink packets currently waiting in the central access manager are being transmitted to the subscriber unit's terminal. In the example shown in FIG. 1, N is selected to be four.

Figure 2:
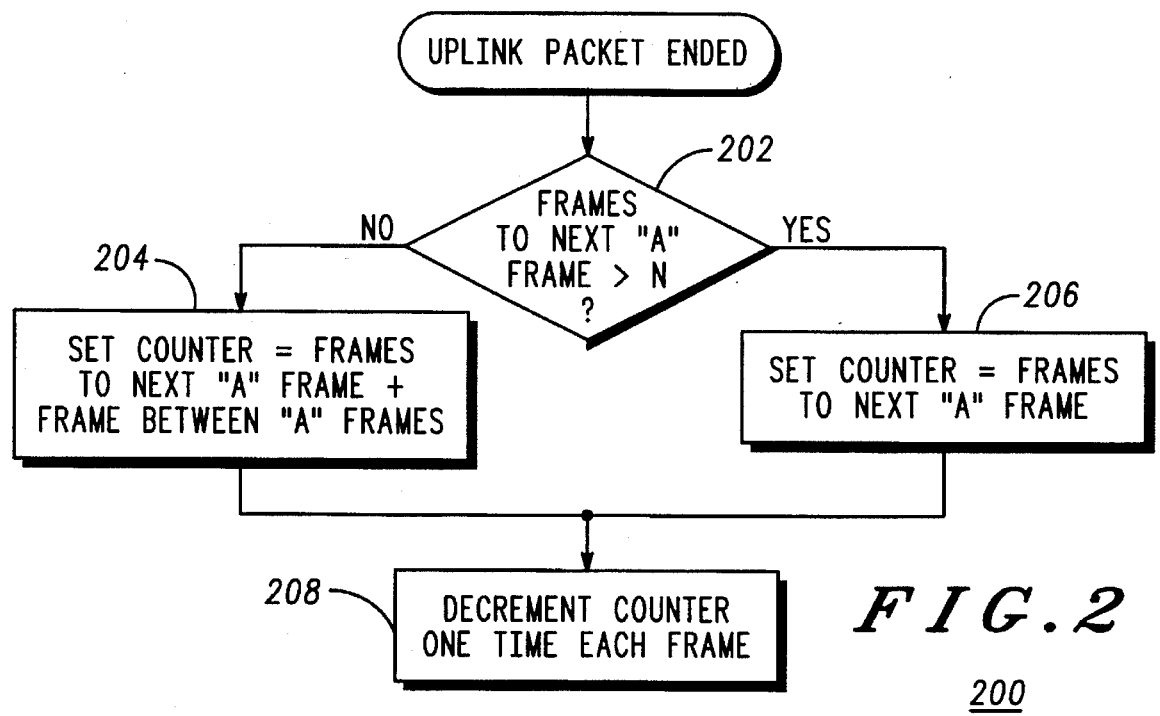
FIG. 2 is a flow chart of steps implemented by a contention timer in a subscriber unit for providing a buffer period in which the central access manager at the base site may schedule collision avoidance in accordance with the present invention.

FIG. 2, numeral 200, is a flow chart of steps implemented by a contention timer in a subscriber unit for providing a buffer period in which the central access manager at the base site may schedule collision avoidance in accordance with the present invention. When an uplink packet has been transmitted, the subscriber unit determines whether a number of frames to a next announcement time slot/frame, A, is greater than N (202). Where the number of frames to the next announcement frame is less than or equal to N, the subscriber unit sets a contention timer to a value that is equal to the sum of the number of frames to the next announcement time slot/frame and the number of frames between adjacent announcement time slots/frames (204). Where the number of frames to the next announcement frame is greater than N, the subscriber unit sets a contention timer to a value that is equal to the number of frames to a next announcement time slot/frame (206). That is, the subscriber unit must wait until it receives an announcement time slot/frame before transmitting a new packet since the announcement time slot/frame information will enable the subscriber unit to avoid transmitting the new packet on a different time slot/frame that is being used by the base site to transmit a downlink packet to the same SU. After the subscriber sets the contention timer, the contention timer decrements each time a frame is completed (208).

Figure 3:
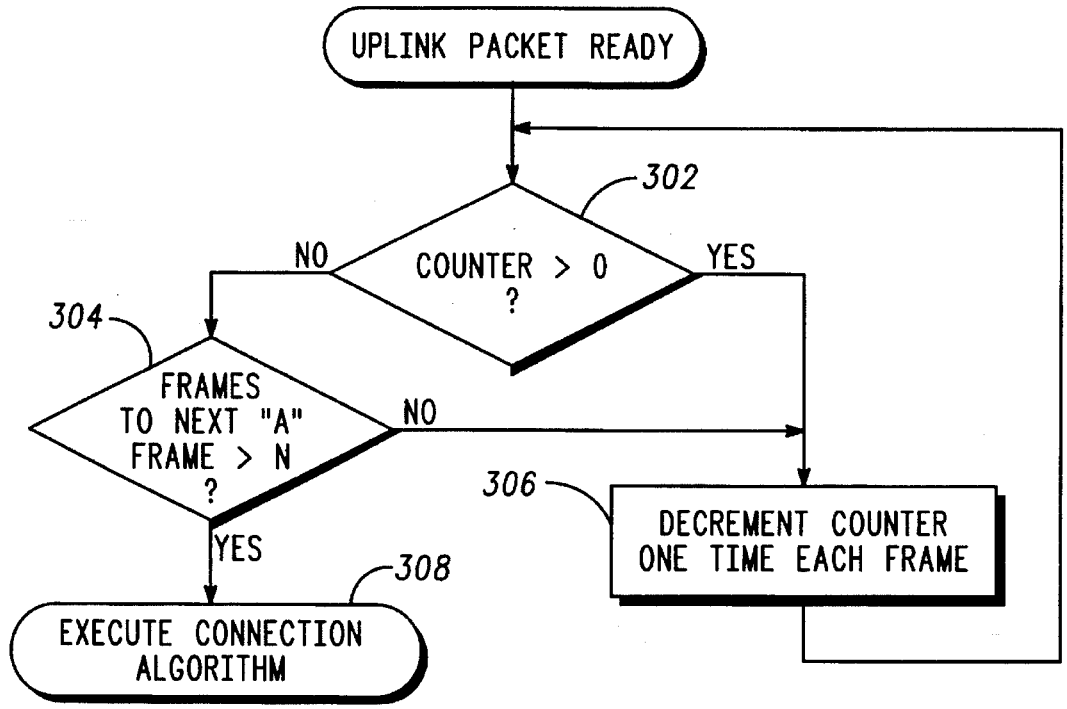
FIG. 3 is a flow chart of one embodiment of steps taken by a subscriber unit prior to executing a contention algorithm in accordance with the present invention.

FIG. 3, numeral 300, is a flow chart of one embodiment of steps taken by a subscriber unit prior to executing a contention algorithm in accordance with the present invention. When an uplink packet is ready to be transmitted, the subscriber unit checks the reading of the contention timer, i.e. counter (302). Where the contention timer has a reading that is greater than or equal to zero, the subscriber unit decrements the contention timer one time each time a frame is completed (306) and recycles to determine the reading of the counter (302). Where the contention timer has a reading that is less than zero, the subscriber unit determines the number of frames to a next announcement time slot/frame, A (304). Where the number of frames to the next announcement frame is less than or equal to N, the subscriber unit decrements the contention timer, one time each time a frame is completed (306) and recycles to determine the reading of the counter (302). Where the number of frames to the next announcement frame is greater than N, the subscriber unit executes a contention algorithm (308) in order to send a packet.

FIG. 4, numeral 400, is a flow chart of steps taken by the central access manager in accordance with the present invention. The central access manager determines whether collision conditions exist for a first packet, i.e., j=1, in the time slot/frame (404). Where collision conditions exist for the packet j, the central access manager places packet j in a buffer, advances to a next packet (410), and determines whether an announcement time slot/frame is full (412), i.e., whether any more addresses may be stored in the announcement time slot/frame. Where the announcement time slot/frame is at least partially empty, the central access manager recycles to determining whether collision conditions exist for a next packet (404). Where the announcement time slot/frame is full, the central access manager transmits the announcement frame (414). Where collision conditions are absent for the packet j, the central access manager places the address of packet j in the announcement time slot/frame (408), advances to a next packet (410), and determines whether an announcement time slot/frame is full (412). Where the announcement time slot/frame is at least partially empty, the central access manager recycles to determining whether collision conditions exist for a next packet (404). Where the announcement time slot/frame is full, the central access manager transmits the announcement frame (414).

FIG. 5, numeral 500, is a flow chart of one embodiment of a method for providing uplink/downlink collision avoidance of packets of transmitted data in a time division multiplex communication system in accordance with the present invention. The method includes the steps of, in parallel: A) determining, by the central access manager during a predetermined time interval, whether a selected subscriber unit is transmitting, and where the selected subscriber unit is idle, transmitting a packet on a contention time slot/frame to the selected subscriber unit (502); and B) waiting, by each of a plurality of subscriber units, for a predetermined length of time between transmission of consecutive packets on an uplink channel to allow transmission of a packet from the central access manager on a downlink channel and checking an announcement time slot/frame to check availability of the contention time slot/frame on the uplink channel prior to transmission of a packet on the contention time slot/frame (504). Typically, to conserve power during waiting, the subscriber units are in a reduced power mode, i.e., "sleep". The predetermined time interval is provided so that the central access manager may determine a status of the uplink channel prior to indicating availability of a contention time slot/frame by placing an address of a packet in a next announcement frame. The predetermined time interval is equivalent to a time required for a predetermined number N, N an integer, of time slots/frames.

The predetermined length of time between transmission of consecutive packets on an uplink channel is selected for the subscriber unit such that sufficient time is allowed for the base site to determine whether the subscriber unit is transmitting and to place announcement information on the status of contention time slots in an announcement time slot/frame and transmit it to the subscriber unit. The predetermined length of time is selected in one of two manners: A) where a number G, G an integer, of collision-resolving time slots/frames located immediately prior to the announcement frame is greater than or equal to the predetermined number N, the predetermined length of time between transmission of consecutive packets is set to a time representing G; and B) where a number of collision-resolving time slots/frames located immediately prior to the announcement frame is less than the predetermined number N, the predetermined length of time between transmission of consecutive packets is set to a time representing the number of time slots/frames between two anouncements time slots/frames plus a number T, T<N, of time slots/frames between a present time slot/frame and the next announcement time slot/frame.

The subscriber unit typically includes a counter, later referred to herein as a contention timer, that indicates a number of time slots/frames representing the predetermined length of time between transmission of consecutive packets on an uplink channel, and decrements once each time slot/frame.

Where selected, the predetermined number N of collision-resolving time slots/frames located immediately prior to the announcement frame may be utilized as downlink channel time slots/frames. The central access manager is typically implemented with a digital signal processor in the base site.

Figure 6:
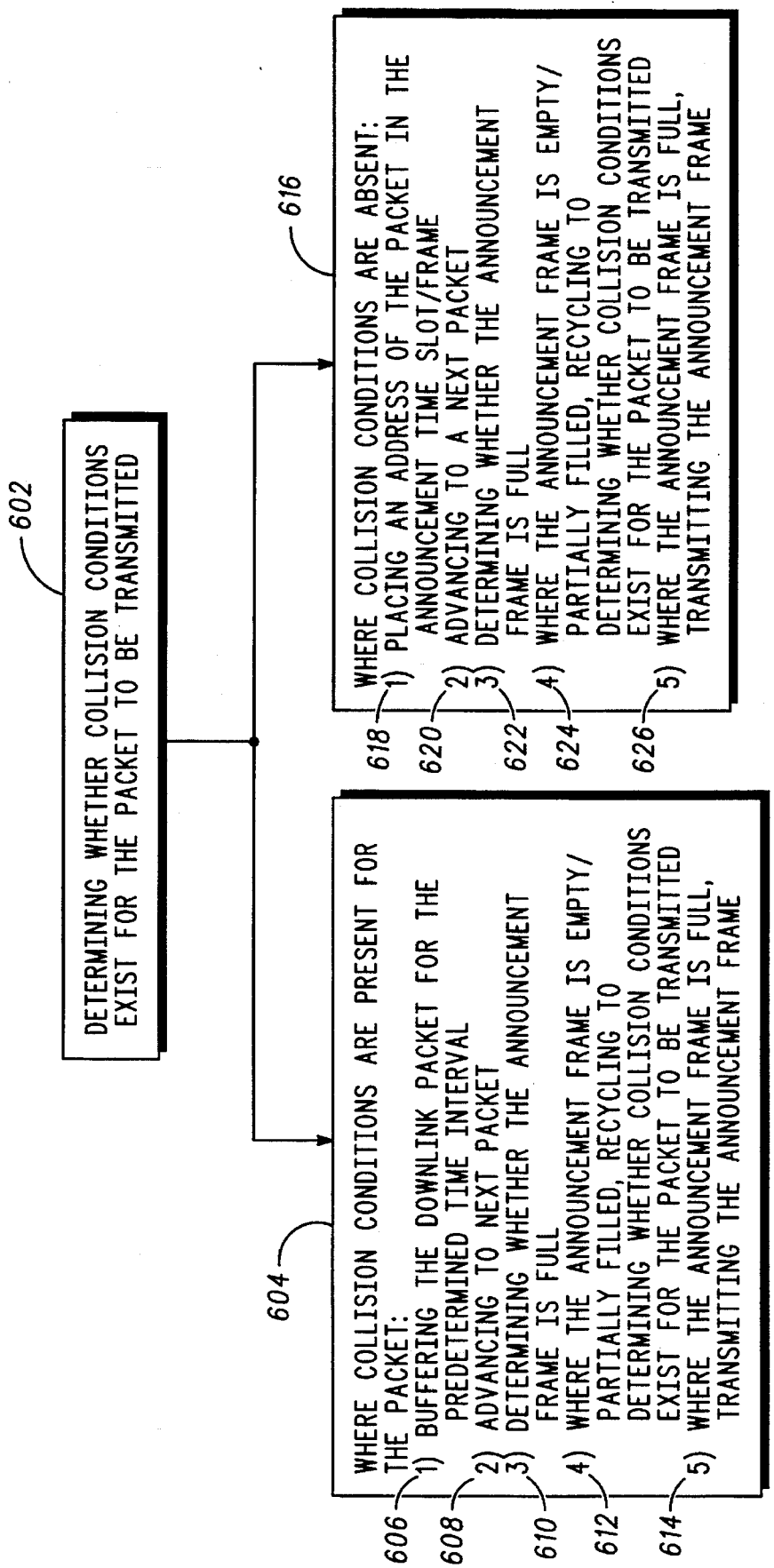
FIG. 6 is a flow chart of one embodiment, shown with greater particularity, of the step of determining, by the central access manager during a predetermined time interval, whether a selected subscriber unit is transmitting, and where the selected subscriber unit is idle, transmitting a packet on a contention time slot/frame to the selected subscriber unit in accordance with the present invention.

FIG. 6, numeral 600, is a flow chart of one embodiment, shown with greater particularity, of the step of determining, by the central access manager during a predetermined time interval, whether a selected subscriber unit is transmitting, and where the selected subscriber unit is idle, transmitting a packet on a contention time slot/frame to the selected subscriber unit in accordance with the present invention comprises the steps of: A) determining whether collision conditions exist for the packet to be transmitted (602); B) where collision conditions are present for the packet (604), B1) buffering the downlink packet for the predetermined time interval (606); B2) advancing to a next packet (608); B3) determining whether the announcement frame is full (610); B4) where the announcement frame is empty/partially filled, recycling to step A (612); B5) where the announcement frame is full, transmitting the announcement frame (614); C) where collision conditions are absent (616), C1) placing an address of the packet in the announcement time slot/frame (618); C2) advancing to a next packet (620); C3) determining whether the announcement frame is full (622); C4) where the announcement frame is empty/partially filled, recycling to step A (624); and C5) where the announcement frame is full, transmitting the announcement frame (626).

Figure 7:
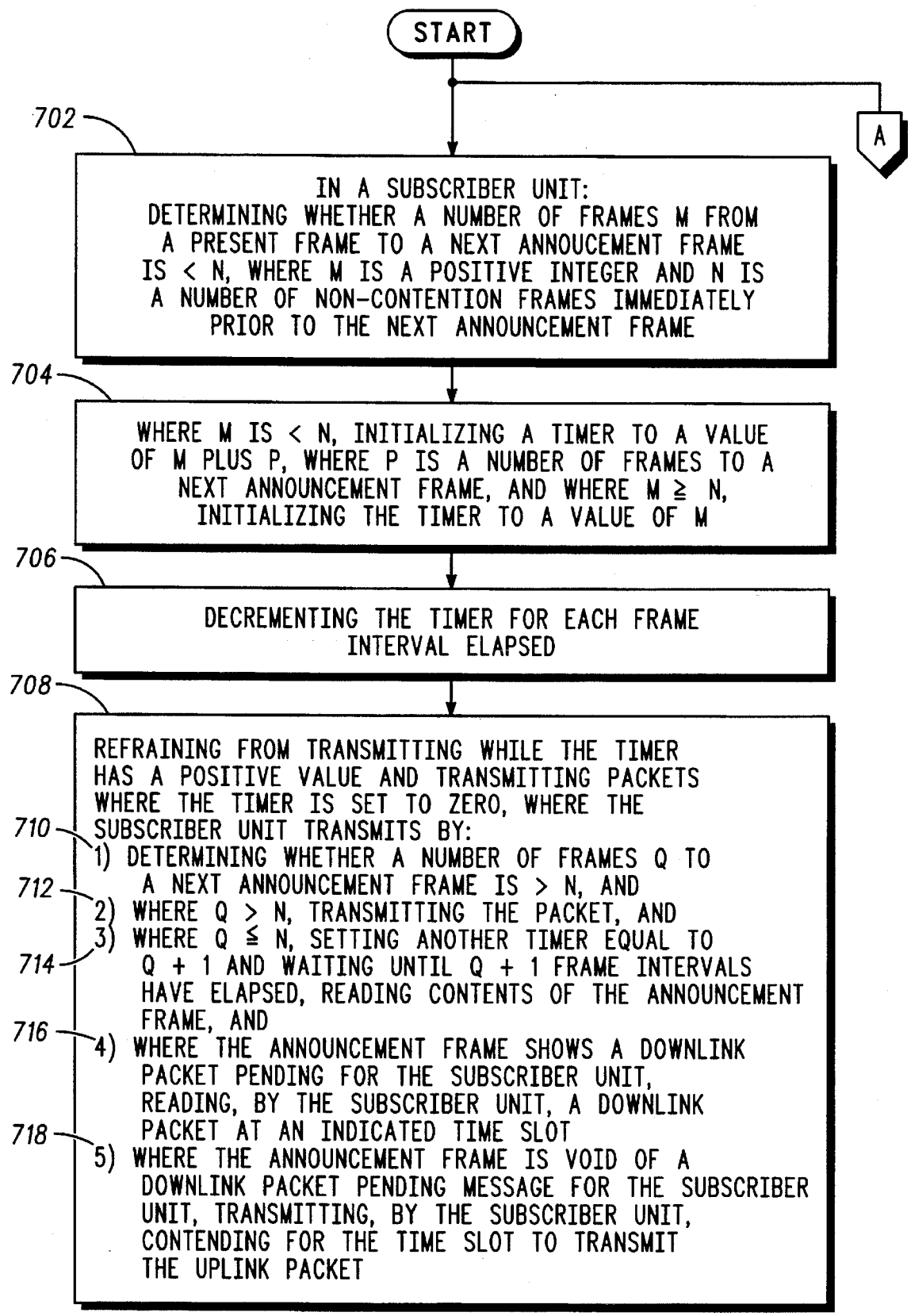
FIG. 7 is a flow chart of another embodiment of a method for providing uplink/downlink collision avoidance of packets of transmitted data in a time division multiplex communication system having P frames between announcement frames, P a positive integer in accordance with the present invention.

FIG. 7, numeral 700, is a flow chart of another embodiment of a method for providing uplink/downlink collision avoidance of packets of transmitted data in a time division multiplex communication system having P frames between announcement frames. P a positive integer in accordance with the present invention. The method includes the steps of: in a subscriber unit, steps A–E: A) determining whether a number of frames M from a present frame to a next announcement frame is <N, where M is a positive integer and N is a number of non-contention frames immediately prior to the next announcement frame (702); B) where M is <N, initializing a timer to a value of M plus P, where P is a number of frames to a next announcement frame, and where M≧N, initializing the timer to a value of M (704); C) decrementing the timer for each frame interval elapsed (706), wherein, while the timer has a positive value, the subscriber unit refrains from transmitting, and wherein, where the timer has a negative value, the subscriber unit is allowed to transmit packets (708), and where the subscriber unit transmits packets, the subscriber unit implements the steps of: D) determining whether a number of frames Q to a next announcement frame is >N (710); E) where Q>N, transmitting the packet (712), and where Q<N, setting another timer equal to Q+1 and waiting until Q+1 frame intervals have elapsed, reading contents of the announcement frame (714), and where the announcement frame shows a downlink packet pending for the subscriber unit, reading, by the subscriber unit, a downlink packet at an indicated time slot(716), and where the announcement frame is void of a downlink packet pending message for the subscriber unit, transmitting, by the subscriber unit, contending for the time slot to transmit the uplink packet (718). In parallel with the subscriber units, the base site performs the following steps: F) determining whether collision conditions exist for the packet to be transmitted (720); G) where collision conditions are present for the packet (722), G1) buffering the downlink packet for the predetermined time interval (724); G2) advancing to a next packet (726); G3) determining whether the announcement frame is full (728); G4) where the announcement frame is empty/partially filled, recycling to step F (730); G5) where the announcement frame is full, transmitting the announcement frame (732); H) where collision conditions are absent (734), H1) placing an address of the packet in the announcement time slot/frame (736); H2) advancing to a next packet (738); H3) determining whether the announcement frame is full (740); H4) where the announcement frame is empty/partially filled, recycling to step F (742); H5) where the announcement frame is full, transmitting the announcement frame (744).

Figure 8:
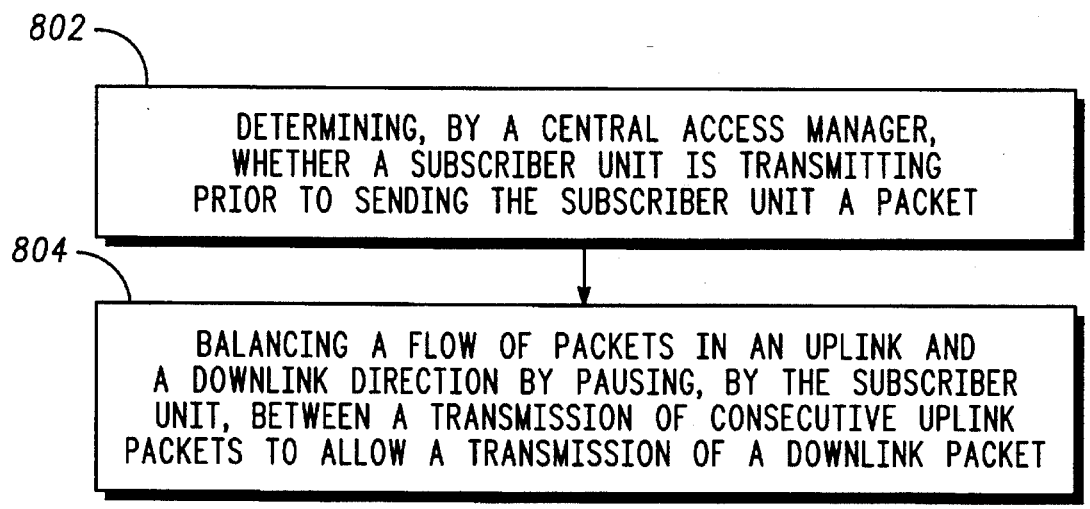
FIG. 8 is a flow chart of another embodiment of a method for providing uplink/downlink collision avoidance of packets of transmitted data in a time division multiplex communication system in accordance with the present invention.

FIG. 8, numeral 800, is a flow chart of another embodiment of a method for providing uplink/downlink collision avoidance of packets of transmitted data in a time division multiplex communication system, comprising the steps of, in parallel, in accordance with the present invention. The method includes the steps of: A) determining, by a central access manager, whether a subscriber unit is transmitting prior to sending the subscriber unit a packet (802); and B) balancing a flow of packets in an uplink and a downlink direction by pausing, by the subscriber unit, between a transmission of consecutive uplink packets to allow a transmission of a downlink packet (804).

Figure 9:
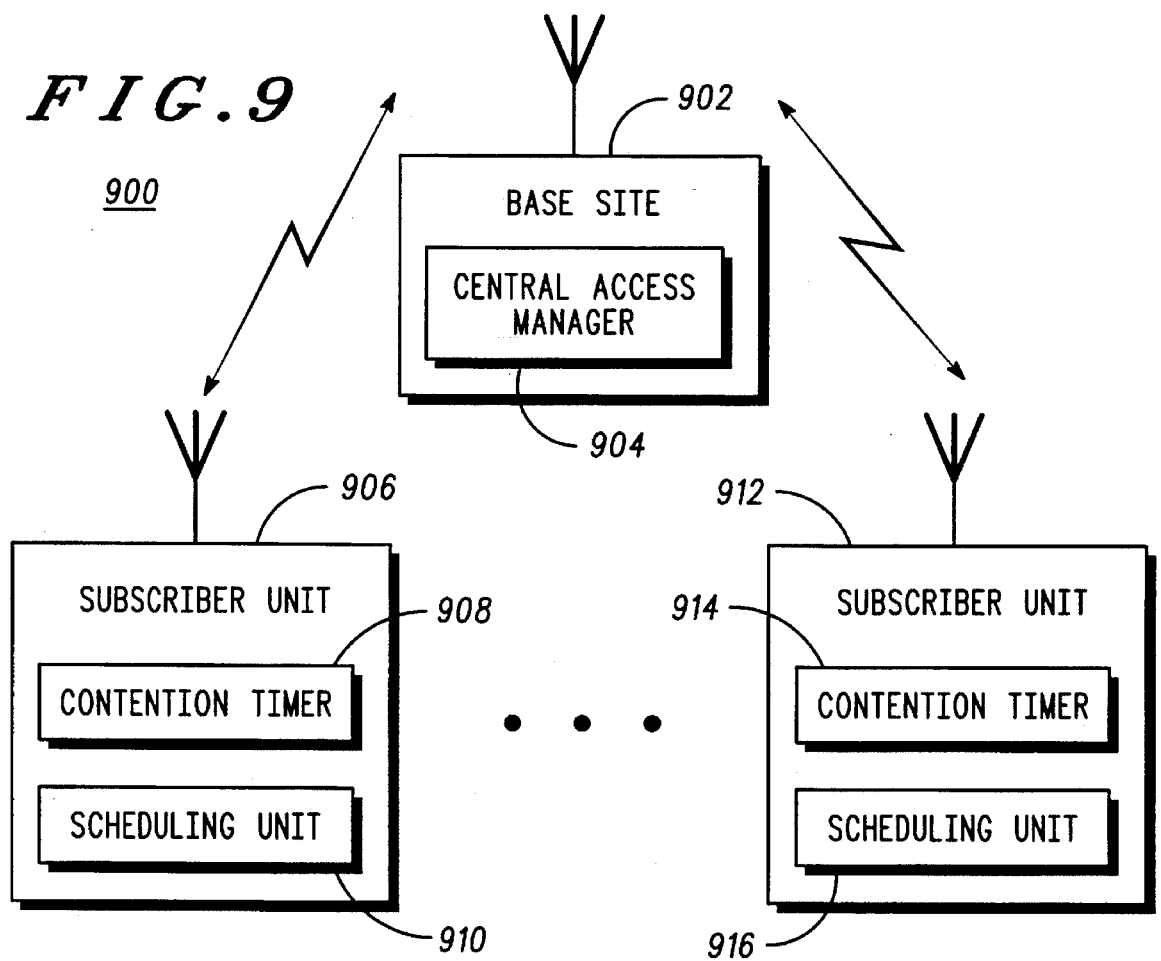
FIG. 9 is a block diagram of a time division multiple access communication system for providing uplink/downlink collision avoidance of packets of transmitted data between a base site and each of a plurality of subscriber units in accordance with the present invention.

FIG. 9, numeral 900, is a block diagram of a time division multiple access communication system for providing uplink/downlink collision avoidance of packets of transmitted data between a base site and each of a plurality of subscriber units in accordance with the present invention. The TDMA communication system includes a base site (902) that has a central access manager (904) and a plurality of subscriber units (906, 912, . . . ), each having a contention timer (908, 914, . . . ) and a scheduling unit (910, 916, . . . ). The central access manager (904) of the base site (902) is used for determining, during a predetermined time interval, whether a selected subscriber unit is transmitting, placing, in an announcement time slot/frame, information giving availability of a contention time slot/frame based on whether the selected subscriber unit is transmitting in the contention time slot/frame, and where the selected subscriber unit is idle, for transmitting a packet on the contention time slot/frame to the selected subscriber unit.

In FIG. 9 the contention timer (908, 914, . . . ) of each of the plurality of subscriber units is used for waiting for a predetermined length of time between transmission of consecutive packets on an uplink channel to allow transmission of a packet from the central access manager on a downlink channel. The scheduling unit (910, 916, . . . ) is operably coupled to the contention timer (908, 914, . . . ) and is used for reading the announcement time slot/frame received from the central access manager to check availability of the contention time slot/frame on the uplink channel prior to transmission of a packet on the contention time slot/frame. During waiting, the subscriber units are typically in a reduced power mode, i.e., "sleep". Again, the predetermined time interval is a time required for the central access manager to determine a status of the uplink channel prior to indicating availability of a contention time slot/frame by placing an address of a packet in a next announcement frame, and the predetermined time interval is equivalent to a time required for a predetermined number N, N an integer, of time slots/frames. The predetermined length of time between transmission of consecutive packets on an uplink channel is typically determined as described above. The selected subscriber unit further maintains a counter that indicates a number of time slots/frames representing the predetermined length of time between transmission of consecutive packets on an uplink channel, and decrementing the counter once each time slot/frame.

The central access manager is generally a digital signal processor in the base site. Determining, by the central access manager (904) whether a selected subscriber unit is transmitting, and where the selected subscriber unit is idle, transmitting a packet on a contention time slot/frame to the selected subscriber unit is typically accomplished as described above for FIG. 6.

Although exemplary embodiments are described above, it will be obvious to those skilled in the art that many alterations and modifications may be made without departing from the invention. Accordingly, it is intended that all such alterations and modifications be included within the spirit and scope of the invention as defined in the appended claims.

We claim:

1. A method for providing uplink/downlink collision avoidance of packets of transmitted data in a time division multiplex communication system, comprising the steps of:

in parallel:
   A) determining, by the central access manager during a predetermined time interval, whether a selected subscriber unit is transmitting, and where the selected subscriber unit is idle, transmitting a packet on a contention time slot/frame to the selected subscriber unit; and
   B) waiting, by each of a plurality of subscriber units, for a predetermined length of time between transmission of consecutive packets on an uplink channel to allow transmission of a packet from the central access manager on a downlink channel and reading an announcement time slot/frame to check availability of the contention time slot/frame on the uplink channel prior to transmission of a packet on the contention time slot/frame.

2. The method of claim 1 wherein, during waiting, the subscriber units are in a reduced power mode, i.e., "sleep".

3. The method of claim 1 wherein the predetermined time interval is a time required for the central access manager to determine a status of the uplink channel prior to indicating availability of a contention time slot/frame by placing an address of a packet in a next announcement frame.

4. The method of claim 3 wherein the predetermined time interval is equivalent to a time required for a predetermined number N, N an integer, of time slots/frames.

5. The method of claims 1 wherein the predetermined length of time between transmission of consecutive packets on an uplink channel comprises:
   A) where a number G, G an integer, of collision-resolving time slots/frames located immediately prior to the announcement frame is greater than the predetermined number N, the predetermined length of time between transmission of consecutive packets substantially equal to a time representing G; and
   B) where a number of collision-resolving time slots/frames located immediately prior to the announcement frame is less than or equal to the predetermined number N, the predetermined length of time between transmission of consecutive packets substantially equal to a time representing the number of time slots/frames between anouncement time slots/frames plus a number T, T<N, of time slots/frames between a present time slot/frame and the next announcement time slot/frame.

6. The method of claim 5 including maintaining, by the subscriber unit, a counter that indicates a number of time slots/frames representing the predetermined length of time between transmission of consecutive packets on an uplink channel, and decrementing the counter once each time slot/frame.

7. The method of claim 1 wherein the central access manager is a digital signal processor in the base site.

8. The method of claim 1 wherein the step of determining, by the central access manager during a predetermined time interval, whether a selected subscriber unit is transmitting, and where the selected subscriber unit is idle, transmitting a packet on a contention time slot/frame to the selected subscriber unit comprises the steps of:
   A) determining whether collision conditions exist for the packet to be transmitted;
   B) where collision conditions are present for the packet,
      B1) buffering the downlink packet for the predetermined time interval;
      B2) advancing to a next packet;
      B3) determining whether the announcement frame is full;
      B4) where the announcement frame is empty/partially filled, recycling to step A;
      B5) where the announcement frame is full, transmitting the announcement frame;
   C) where collision conditions are absent,
      C1) placing an address of the packet in the announcement time slot/frame;
      C2) advancing to the next packet;
      C3) determining whether the announcement frame is full;
      C4) where the announcement frame is empty/partially filled, recycling to step A;
      C5) where the announcement frame is full, transmitting the announcement frame.

9. A method for providing uplink/downlink collision avoidance of packets of transmitted data in a time division multiplex communication system having P frames between announcement frames, P a positive integer, comprising the steps of:

in a subscriber unit:
   A) determining whether a number of frames M from a present frame to a next announcement frame is <N, where M is a positive integer and N is a number of non-contention frames immediately prior to the next announcement frame,
   B) where M is <N, initializing a timer to a value of M plus P, where P is a number of frames to a next announcement frame,
   and where M≧N, initializing the timer to a value of M
   C) decrementing the timer for each frame interval elapsed,
      wherein, while the timer has a positive value, the subscriber unit refrains from transmitting, and
      wherein, where the timer has a negative value, the subscriber unit is allowed to transmit packets,
   and where the subscriber unit transmits packets,
the subscriber unit implements the steps of:
   D) determining whether a number of frames Q to a next announcement frame is >N,
   E) where Q>N, transmitting the packet, and
      where Q≦N, setting another timer equal to Q+1 and waiting until Q+1 frame intervals have elapsed, reading contents of the announcement frame and where the announcement frame indicates a downlink packet pending for the subscriber unit, reading, by the subscriber unit, a downlink packet at an indicated time slot, and where the announcement frame is void of a downlink packet pending message for the subscriber unit, transmitting, by the subscriber unit, in contention for the time slot to transmit the uplink packet, for the base site, F) determining whether collision conditions exist for the packet to be transmitted;

G) where collision conditions are present for the packet,

G1) buffering the downlink packet for the predetermined time interval;

G2) advancing to a next packet;

G3) determining whether the announcement frame is full;

G4) where the announcement frame is empty/partially filled, returning to step F;

G5) where the announcement frame is full, transmitting the announcement frame;

H) where collision conditions are absent,

H1) placing an address of the packet in the announcement time slot/frame;

H2) advancing to a next packet;

H3) determining whether the announcement frame is full;

H4) where the announcement frame is empty/partially filled, recycling to step F;

H5) where the announcement frame is full, transmitting the announcement frame.

10. A time division multiple access communication system for providing uplink/downlink collision avoidance of packets of transmitted data between a base site and each of a plurality of subscriber units, comprising:

A) the base site having a central access manager, for determining, during a predetermined time interval, whether a selected subscriber unit is transmitting, placing, in an announcement time slot/frame, information giving availability of a contention time slot/frame based on whether the selected subscriber unit is transmitting in the contention time slot/frame, and where the selected subscriber unit is idle, for transmitting a packet on the contention time slot/frame to the selected subscriber unit; and B) each of the plurality of subscriber units comprising:

B1) a contention timer, for waiting for a predetermined length of time between transmission of consecutive packets on an uplink channel to allow transmission of a packet from the central access manager on a downlink channel; and B2) a scheduling unit, operably coupled to the contention timer, for reading the announcement time slot/frame received from the central access manager to check availability of the contention time slot/frame on the uplink channel prior to transmission of a packet on the contention time slot/frame.

11. The time division multiple access communication system of claim 10 wherein, during waiting, the subscriber units are in a reduced power mode, i.e., "sleep".

12. The time division multiple access communication system of claim 10 wherein the predetermined time interval is a time required for the central access manager to determine a status of the uplink channel prior to indicating availability of a contention time slot/frame by placing an address of a packet in a next announcement frame.

13. The time division multiple access communication system of claim 12 wherein the predetermined time interval is equivalent to a time required for a predetermined number N, N an integer, of time slots/frames.

14. The time division multiple access communication system of claim 13 wherein the predetermined length of time between transmission of consecutive packets on an uplink channel comprises:

A) where a number G, G an integer, of collision-resolving time slots/frames located immediately prior to the announcement frame is greater than or equal to the predetermined number N, the predetermined length of time between transmission of consecutive packets substantially equal to a time representing G; and B) where a number of collision-resolving time slots/frames located immediately prior to the announcement frame is less than the predetermined number N, the predetermined length of time between transmission of consecutive packets substantially equal to a time representing the number of time slots/frames between anouncement time slots/frames plus a number T, T<N, of time slots/frames between a present time slot/frame and the next announcement time slot/frame.

15. The time division multiple access communication system of claim 14 wherein the selected subscriber unit further maintains a counter that indicates a number of time slots/frames representing the predetermined length of time between transmission of consecutive packets on an uplink channel, and decrementing the counter once each time slot/frame.

16. The time division multiple access communication system of claim 10 wherein the central access manager is a digital signal processor in the base site.

17. The time division multiple access communication system of claim 10 wherein the central access manager, in determining whether a selected subscriber unit is transmitting, and where the selected subscriber unit is idle, transmitting a packet on a contention time slot/frame to the selected subscriber unit utilizes the following:

A) determining whether collision conditions exist for the packet to be transmitted;

B) where collision conditions are present for the packet,

B1) buffering the downlink packet for the predetermined time interval;

B2) determining whether the announcement frame is full;

B3) where the announcement frame is empty/partially filled, recycling to step A;

B4) where the announcement frame is full, transmitting the announcement frame;

C) where collision conditions are absent,

C1) placing an address of the packet in the announcement time slot/frame;

C2) advancing to a next packet

C3) determining whether the announcement frame is full;

C4) where the announcement frame is empty/partially filled, recycling to step A;

C5) where the announcement frame is full, transmitting the announcement frame.

* * * * *